United States Patent

Hamilton et al.

[11] Patent Number: 5,991,534
[45] Date of Patent: Nov. 23, 1999

[54] METHOD AND APPARATUS FOR EDITING A SOFTWARE COMPONENT

[75] Inventors: Graham Hamilton, Palo Alto; Laurence P. G. Cable, Mountain View, both of Calif.

[73] Assignee: Sun Microsystems, Inc., Palo Alto, Calif.

[21] Appl. No.: 08/868,038

[22] Filed: Jun. 3, 1997

[51] Int. Cl.$^6$ ........................................ G06F 9/44
[52] U.S. Cl. .................. 395/701; 395/710; 345/333; 345/335; 345/339; 345/352; 707/100; 707/102; 707/103; 707/1
[58] Field of Search ............................. 395/701, 705, 395/682, 683, 710; 345/326, 333, 335, 339, 352–354, 433; 707/100, 102–104, 13

[56] References Cited

U.S. PATENT DOCUMENTS

| 5,490,245 | 2/1996 | Wugofski | 345/348 |
|---|---|---|---|
| 5,600,778 | 2/1997 | Swanson et al. | 345/333 |
| 5,603,034 | 2/1997 | Swanson | 395/701 |
| 5,682,510 | 10/1997 | Zimmerman et al. | 345/35.2 |
| 5,754,858 | 5/1998 | Broman et al. | 395/701 |
| 5,764,226 | 6/1998 | Consolatti et al. | 345/333 |
| 5,778,227 | 7/1998 | Jordan | 395/682 |
| 5,784,583 | 7/1998 | Redpath | 345/353 |
| 5,787,431 | 7/1998 | Shaughnessy | 707/100 |
| 5,790,855 | 8/1998 | Faustini | 395/701 |
| 5,794,006 | 8/1998 | Sanderman | 395/500 |

OTHER PUBLICATIONS

Graham Hamilton, JavaBeans™, Jul. 24, 1997, Sun Microsystems, pp. 1–114.

*Primary Examiner*—Tariq R. Hafiz
*Assistant Examiner*—Tuan Q. Dam
*Attorney, Agent, or Firm*—Beyer & Weaver, LLP

[57] ABSTRACT

Methods, software, and apparatus for customizing a component for use with an application builder tool are disclosed. A method for customizing a component which has at least one associated property with an associated data type involves obtaining the component, obtaining an editor that is arranged to modify the property, and adding the editor to a customizer that is associated with said component. Then, the property is modified using the editor. In one embodiment, the method further includes configuring the component by implementing the modified property. In another embodiment, the component is an instance of an associated component class, and obtaining the component involves obtaining the component class and creating the instance of the component class. In such an embodiment, each property associated with the component is identified.

23 Claims, 3 Drawing Sheets

METHOD AND APPARATUS FOR EDITING A SOFTWARE COMPONENT

CROSS REFERENCE TO RELATED APPLICATION

U.S. patent application Ser. No. 08/868,293, entitled "Method and Apparatus for Customizing a Software Component," filed concurrently herewith, is related to the present application and is incorporated herein by reference in its entirety.

BACKGROUND OF THE INVENTION

1. Field of Invention

The present invention relates generally to methods and apparatus for use in application builder tools, and more particularly, to methods and apparatus for use in editing properties associated with software components.

2. Background

As computer usage becomes increasingly widespread, the desire for custom computer applications which are specific to the needs of a particular user is also increasing. The use of visual builder tools, or application builder tools, enables computer applications to be readily created. Builder tools generally include standard sets of software modules, or "building blocks," which can be interlinked to create custom-built applications.

Many visual based applications builder tools, as for example Visual Basic, available from Microsoft, Inc. of Redmond, Wash., have a graphical user interface which includes a "toolbox", a "form window", and a "property sheet". A toolbox typically contains icons which represent different classes of components, or software modules. Alternatively, the toolbox may contain text which represents different classes of components. It should be appreciated that many different classes of components may exist. By way of example, different classes can include complex components, e.g., database viewers, and simple components, e.g., buttons. A form window is a display window in which an application may be composed. A component selected from the toolbox may be "dropped", or otherwise placed, within the form window. Placing a component refers to placing an icon, or a screen representation of the component, within the form window. A property sheet displays properties relating to the selected component. The properties can include, but are not limited to, information relating to the size, color, and name of the selected component.

Application builder tools often enable a user to create new data types and, hence, new properties, which correspond to components, as is well-known to those skilled in the art. By way of example, a user can define a data type relating to color, and associate a "color" property to a component which previously had no color. In other words, a user can add color to a component by appropriately defining a data type which relates to color. The ability to create new properties furthers the ability to customize components and, therefore, software applications, to meet the particular needs of a user.

In general, a property sheet displays a set of properties which can be modified to customize, or configure, a given component. Hence, a user can select and modify different properties in the property sheet, or "customizer," in order to customize a component. Editors are often provided for each property that can be modified. As such, the property sheet typically provides an editor for each property which can be updated, or otherwise altered. The editors generally facilitate the editing of properties through the use of graphical user interfaces.

Conventional application builder tools typically provide a fixed set of editors for properties which are associated with a property sheet. While interfacing with fixed sets of editors through the use of property sheets has been shown to be successful in enabling custom applications to be created, the use of fixed sets of editors can be limiting. While many application builder tools enable new data types to be created, the application builder tools do not enable editors associated with the new data types to be instantiated into property sheets. The inability to add new editors to property sheets prohibits any newly created data type and, as a result, any newly created property associated with a component, from being readily modified. That is, the new properties cannot be edited using a property sheet, and instead must be modified at the level of software at which the associated new data type was created. As a result, the customization of components and applications is basically restricted to the ability to modify only the fixed properties associated with a software component, while the modification of any new properties cannot be accomplished through the use of a property sheet. Modifying properties without the benefit of interfaces associated with a property sheet is generally inefficient and time-consuming.

Therefore, what is desired is a method and an apparatus which enables newly created properties for software components to be readily associated with a customizer, e.g., a property sheet. Specifically, what is desired is a method and an apparatus for creating editors for new properties which can be associated with, e.g., instantiated into, customizers to facilitate and enhance the customization of a component.

SUMMARY OF THE INVENTION

The present invention relates, in one aspect, to a computer-implemented method of customizing a component for use with an application builder tool. The component has at least one associated property with an associated data type. The method involves obtaining the component, obtaining an editor that is arranged to modify the property, and adding the editor to a customizer that is associated with said component. Then, the property is modified using the editor.

In one embodiment, the method further includes configuring the component by implementing the modified property. In another embodiment, the component is an instance of an associated component class, and obtaining the component involves obtaining the component class and creating the instance of the component class. In such an embodiment, each property associated with the component is identified.

According to another aspect of the present invention, a computer-implemented method for locating a first editor arranged to modify a first property associated with a component that is to be used with an application builder tool involves searching a register which contains a listing of data types and editors that correspond to the data types. The method also involves determining if the first editor is one of the editors contained in the register, where the first editor is instantiated from a first editor class and associated with a first data type that is associated with the first property. In one embodiment, when it is determined that the first editor is not one of the editors contained in the register, then a search is made for the first editor using the first editor class.

In still another aspect of the present invention, a user interface for use in customizing a component that is to be used with an application builder tool on a computer system includes at least one property editor that is associated with a property of the component, and an associated customizer that is arranged to enable the property associated with the component to be modified through the use of the property editor. In one embodiment, the data type is a new data type, and the property editor is a new property editor that is associated with the new data type. In another embodiment, the new property editor is added to said customizer.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Certain embodiments of a method and apparatus for customizing software components will be described below making reference to the accompanying drawings.

Figure 1:
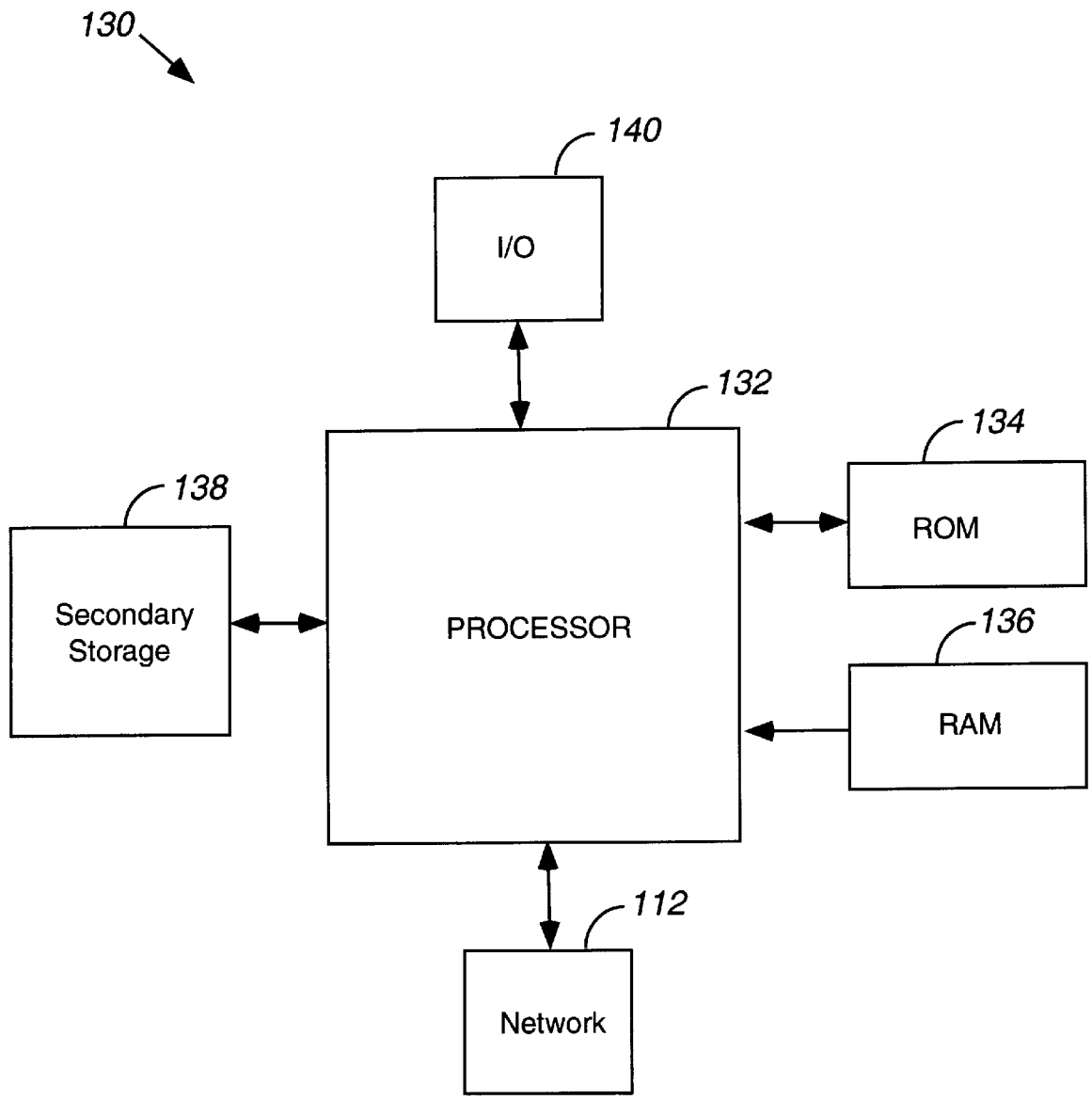
FIG. 1 is a diagrammatic representation of a computer system suitable for implementing the present invention.

FIG. 1 illustrates a typical computer system suitable for implementing the present invention. The computer system 130 includes any number of processors 132 (also referred to as central processing units, or CPUs) that are coupled to memory devices including primary storage devices 134 (typically a read only memory, or ROM) and primary storage devices 136 (typically a random access memory, or RAM). As is well known in the art, ROM 134 acts to transfer data and instructions uni-directionally to the CPU 132, while RAM 136 is used typically to transfer data and instructions in a bi-directional manner. Both primary storage devices 134, 136 may include any suitable computer-readable media. A mass memory device 138 is also coupled bi-directionally to CPU 132 and provides additional data storage capacity. The mass memory device 138 may be used to store programs, data and the like and is typically a secondary storage medium such as a hard disk that is slower than primary storage devices 134, 136. Mass memory storage device 138 may take the form of a magnetic or paper tape reader or some other well-known device. It will be appreciated that the information retained within the mass memory device 138, may, in appropriate cases, be incorporated in standard fashion as part of RAM 136 as virtual memory. A specific mass storage device such as a CD-ROM 134 may also pass data uni-directionally to the CPU.

CPU 132 is also coupled to one or more input/output devices 140 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 132 optionally may be coupled to a computer or telecommunications network, e.g., an Internet network or an intranet network, using a network connection as shown generally at 112. With such a network connection, it is contemplated that the CPU 132 might receive information from the network, or might output information to the network in the course of performing the above-described method steps. The above-described devices and materials will be familiar to those of skill in the computer hardware and software arts.

Application builder tools, which are used to construct custom applications for use on computer systems, include components that can be linked together to form applications. Application builder tools can include, but are not limited to, "Web page" builders used to create information sites on an aspect of the Internet known as the World Wide Web, application builders, and document editors. To simplify the construction of custom computer applications, application builder tools, or, more specifically, visual application builder tools, are generally provided with an interface which displays a set of properties that can be edited to customize an associated component. One particularly suitable interface is described in above-referenced U.S. patent application Ser. No. 08/828,293, which is incorporated herein by reference.

In general, a customizer interface can be provided in a special class which inherits from component classes, i.e., a customizer class can have an associated component class. The customizer class provides a user interface, which is specific to a particular component or a particular group of components, that can be used to customize the particular component or the particular group of components.

A property editor is an instance of a property editor class that enables a known property value, i.e., a value associated with a property, to be edited through any suitable interface, as for example a customizer interface. In one embodiment, a customizer interface includes a property editor, which is instantiated in the customizer interface, and serves to allow a property value to be edited through the use of a graphical user interface (GUI). Developers of software components and, in some embodiments, application developers, can create new property editors for any data types which can be used as properties that are associated with the software components.

The property editor class generally provides many methods for reading and writing property values, and can be instantiated as a part of any suitable customizer, as for example a property sheet. In general, a property editor can be represented in any number of different ways, as for example as a string which can be updated, or as a complex display window which contains strings that can be updated. It should be appreciated that the "higher-level" tool, e.g., an application builder tool, with which the property editor is associated determines exactly how the property editor is to be presented.

To simplify the construction of custom computer applications, application builder tools, or, more specifically, visual application builder tools, are generally provided with a property sheet which displays a set of properties that can be configured to customize a component associated with the property sheet. In one embodiment, property editors instantiated as part of a property sheet can be subclasses of the component class, either directly or indirectly.

The use of a customizer, or a user interface which directs a user through the customization of a component, reduces the potential for errors such as the erroneous modification of properties which were accidentally selected to be modified. As larger components, e.g., databases, typically include a substantial number of properties, and, hence, can be configured in many different ways, the use of a customizer is especially advantageous in that the customizer can guide a user through an efficient customization of larger components.

The use of property editors in conjunction with a customizer facilitates the addition of properties which can be edited through the use of the customizer. Without property editors, when a new data type and, consequently, a new property, is added to properties associated with a given component, a new customizer must basically be created to reflect the addition of a new, configurable property. The ability to add new property editors to a customizer provides flexibility in the customization of software components. Further, the addition of new property editors to a customizer simplifies the overall customization process.

Figure 2:
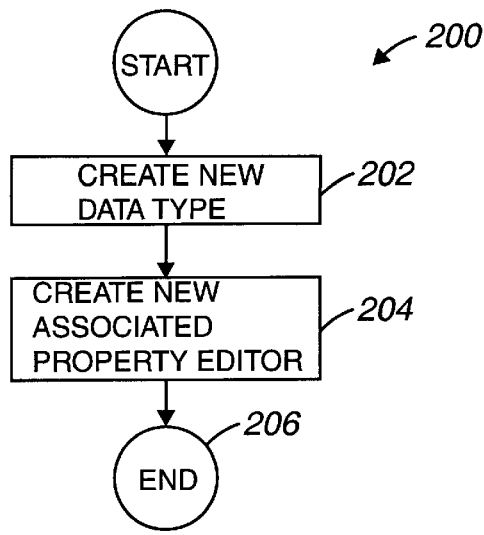
FIG. 2 is a process flow diagram which illustrates the steps associated with the development of a property editor for a data type in accordance with an embodiment of the present invention.

Referring next to FIG. 2, a process flow diagram which illustrates the steps associated with the development of a property editor for a data type will be described in accordance with an embodiment of the present invention. It should be appreciated that software components are generally associated with properties which are of particular data types. Although the software component with which the data types are associated may be any suitable component, in the described embodiment, the software component is a Java™ Bean, which is a reusable software component created using the Java™ programming language available from Sun Microsystems, Inc. of Mountain View, Calif.

A Java™ Bean is generally a software component that can be manipulated within a visual application builder. By way of example, a Java™ Bean can be a "simple" element such as a button in a graphical user interface (GUI), or a Java™ Bean can be a more "complex" element such as a database viewer. In some embodiments, while a Java™ Bean may have no corresponding visual representation, the Java™ Bean is at least suitable for being composed visually within an application builder through the use of a customizer. It should be appreciated that the Java™ Bean may be associated with a customizer class which, in the Java™ environment, is typically a part of the Abstract Windowing Toolkit (AWT), which is a platform-independent user interface toolkit available from Sun Microsystems, Inc. of Mountain View, Calif.

The development process 200 for creating a property editor begins at a step 202 with the creation of a new data type. Typically, a new data type is created, or defined, by an individual who is developing software components, e.g., a component developer. However, it should be appreciated that in some embodiments, as for example in the described embodiment, an application developer, or an individual who is creating an application using an application builder tool, can also create new data types.

After the new data type is created, an associated property editor is created for the data type in a step 204. As each property has an associated data type, e.g., a color or a font, the property editors are created for new data types for use in the modification of properties. One example of a property editor will be described below with respect to FIGS. 4a and 4b. A component developer may wish to provide a property editor which can be instantiated into a customizer, as will be described with respect to FIG. 3, to facilitate the editing of properties associated with the new data type. It should be appreciated that the creation of a property editor is essentially the creation of a property editor class.

In the described embodiment, the software component is a Java™ Bean. As such, the properties of the software component are Java™ data types. A Java™ data type is typically a class. In order to facilitate the "mapping," or association, of an instance of a property editor class with a corresponding data type, a manager class is provided. The manager class can serve the purpose of mapping each Java™ data type to an appropriate property editor which is suitable for use in modifying a property value associated with the data type. It should be appreciated that although the manager class can use any suitable method for mapping a property editor class with a corresponding data type, in general, the manager class maintains a registry of property editors which enables an editor class to be registered to act as the property editor for a particular data type. Once a property editor is created for the new data type, the process of developing a property editor is completed at 206.

Figure 3:
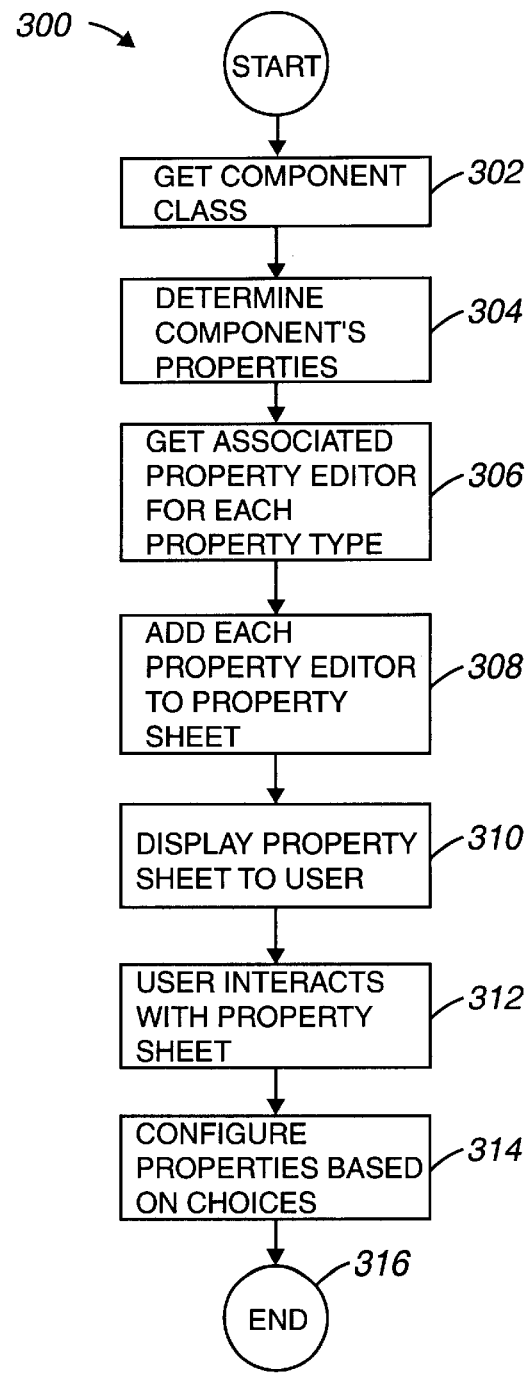
FIG. 3 is a process flow diagram which illustrates the steps associated with using property editors to configure properties for a software component in accordance with an embodiment of the present invention.

With reference to FIG. 3, the steps associated with using property editors to configure properties for a software component will be described in accordance with an embodiment of the present invention. The process of editing a software component begins at a step 302, in which a component class is obtained. The component class is generally a class from which a software component can be instantiated. After the component class is obtained, the properties associated with the component class, and, therefore, an instance of a software component created from the component class, are determined in a step 304. Although the properties associated with a component may vary widely, typical properties can include, by way of example, information which relates to the size of the component, information which relates to the color of the component, and information which relates to the name of the component.

Once properties are identified in step 304, process flow proceeds to a step 306 in which the property editor associated with each property type is obtained. In some embodiments, all property editors associated with a component, i.e., the property editors for every configurable property associated with a component, are obtained. Although any suitable technique can be used to locate the appropriate property editor for a particular data type, one suitable technique involves searching a registry maintained by a manager class. In the event that a property editor that is appropriate for a new data type class cannot be located through the registry, then a wider-ranging search can be initiated for the editor class that corresponds to the data type class. By way of example, in the described embodiment, a property editor class associated with a data type class named "foo.bah.Fred" has a name "foo.bah.FredEditor." That is, the property editor class includes the name of the associated data type class. As such, a search can readily be made to locate the proper editor class, and, hence, an appropriate editor for use with a given data type, by searching for an editor class name which is an extension of the data type class name.

If the proper editor class, e.g., the editor class which includes the name of the given data type, cannot be located through a search for the editor class that corresponds to the data type class, then, in some embodiments, a search can be initiated for a standard editor class from which a suitable property editor can typically be obtained. By way of example, in a Java™ environment, a data type class named "foo.bah.Fred" may have a standard editor class with the name "java.beans.standard.editors.FredEditor." The standard editor class can be part of a "default" package of editor classes which are provided by the application builder tool. Alternatively, the standard editor class can be part of a set of property editor classes defined by a user.

After property editors are obtained for each property type, each property editor is added to the property sheet associated with the component in a step 308. As the property sheet displays the properties which can be modified to customize a given component, a user can select a property, then modify that property through the use of the property editor associated with that property. It should be appreciated that a property sheet can be constructed by an application builder such that the property sheet lists the properties associated with the component. That is, when a component, e.g., a Java™ Bean, exports a set of properties, an application builder tool can use the properties to construct a property sheet that lists the properties.

After property editors are added to the property sheet, process flow moves to a step 310 in which the property sheet is displayed to a user. In the described embodiment, the property sheet is displayed on a computer screen as part of a graphical user interface (GUI), although any suitable user interface can be used. The user interacts with the property sheet in a step 312. "Interacting" with the property sheet typically involves selecting a property from the property sheet, and using the associated property editor to then edit the property. Once the user has interacted with the property sheet, the properties are configured in a step 314 based upon choices made by the user. That is, the property values of the component are modified to reflect the changes made by the user in step 312. Finally, after the properties are configured, the process of configuring a component through the use of property editors is completed at 316.

Figure 4A:
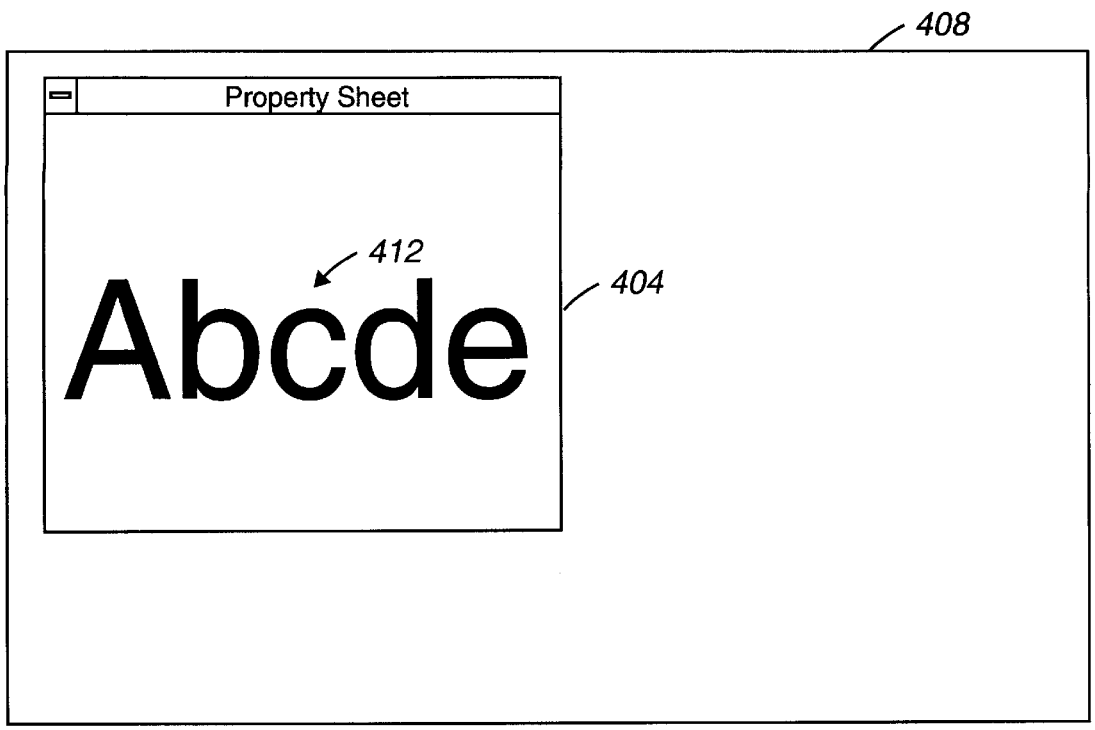
FIG. 4a is a diagrammatic representation of a property sheet displayed on a computer screen in accordance with an embodiment of the present invention.

When components are to be configured through the use of a property editor, the component first provides a property that is to be edited. Once the property is provided, a system, e.g., an application, associated with the component identifies an associated editor. By way of example, when a component provides a "font" property that is to be edited, the system associated with the component locates the associated "FontEditor" type. Then, within a property sheet associated with the component, the FontEditor displays an example of the font property. FIG. 4a is a diagrammatic representation of a property sheet in accordance with an embodiment of the present invention. A property sheet 404 is displayed to a user, on a display medium 408, e.g., a computer screen. Property sheet 404 includes an example of a font 412. It should be appreciated that although property sheet 404 is shown as displaying only the example of font 412, property sheets may generally display a number of examples of other properties that are associated with a component. However, for purposes of illustration, property sheet 404 is shown as including only the example of font 412.

Figure 4B:
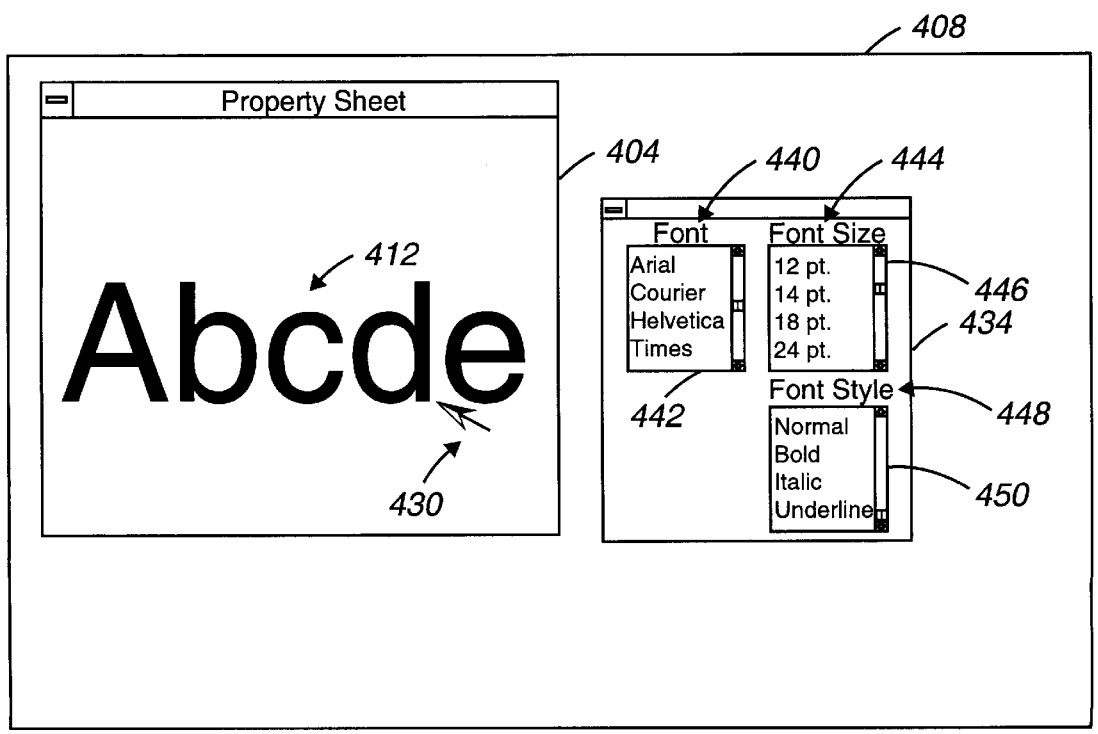
FIG. 4b is a diagrammatic representation of the property sheet of FIG. 4a with an associated property editor in accordance with an embodiment of the present invention.

When a user selects the example of font 412, a property editor for font 412 is displayed to the user. FIG. 4b is a diagrammatic representation of the property sheet of FIG. 4a displayed with an associated property editor in accordance with an embodiment of the present invention. Within display medium 408, when the example of font 412 in property sheet 404 is selected by a user, e.g., selected using a cursor 430, a property editor 434 that may be used to modify properties of font 412 is displayed. Property editor 434 is a "dialog box", as property editor 434 is arranged to accept user input. As shown, property editor 434 includes selectable choices for a font type 440, a font size 444, and a font style 448. In the described embodiment, the choices are displayed in a scroll boxes 442, 446, 450, although the choices may generally be displayed in any suitable format. A user may select a desired font type 440, font size 444, and font style 450 for font.

In general, the use of property editors which are essentially "plug-and-play" property editors, i.e., property editors which may be used with a number of different property sheets and, hence, a number of different components, enables built-in editing support for common types associated with components may be substantially eliminated. By way of example, property editors for font types and colors may be created for use with a number of different components. As such, for components with properties which include font types and colors, property editors, rather than built-in editing support, for font types and colors may be used.

Although only a few embodiments of the present invention have been described, it should be understood that the present invention may be embodied in many other specific forms without departing from the spirit or the scope of the present invention. By way of example, steps involved with customizing a software component using property editors can be reordered. Steps may also be removed or added without departing from the spirit or the scope of the present invention. For example, the process of customizing a software component using property editors can require that rather than configuring all properties after a user has completed his or her interaction with the property sheet, the properties can be configured as each property is set by the user, without departing from the spirit or scope of the present invention. That is, the configuration of properties can be performed more-or-less in "real-time," i.e., as changes to properties are being made during the course of the user's interaction with the property sheet. Therefore, the described embodiments should be taken as illustrative and not restrictive, and the invention should be defined by the following claims and their full scope of equivalents.

We claim:

1. A computer-implemented method of customizing a component for use with an application builder tool, said computer-implemented method comprising:
   (a) obtaining a component, said component being capable of having a plurality of associated properties, each of said properties having an associated data type;
   (b) obtaining an editor for a new property;
   (c) adding said editor to a property sheet, said property sheet being associated with said component, said editor being arranged to associate said new property with said component and said editor further being arranged to modify said new property; and
   (d) modifying said new property using said editor.

2. A computer-implemented method of customizing a component as recited in claim 1 further including:
   (e) configuring said component, wherein configuring said component further includes implementing said modified property.

3. A computer-implemented method of customizing a component as recited in claim 1 wherein steps (b) and (c) are repeated for each property associated with said component.

4. A computer-implemented method of customizing a component as recited in claim 1 wherein said component is an instance of an associated component class, and obtaining said component includes obtaining said component class and creating said instance of said component class.

5. A computer-implemented method of customizing a component as recited in claim 4 further includes identifying each property associated with said component.

6. A computer-implemented method of customizing a component as recited in claim 1 wherein said new property has an associated new data type, and wherein said editor is a new editor that is added to said property sheet.

7. A computer-implemented method of customizing a component as recited in claim 6 wherein obtaining said editor for said property involves creating said new editor for said new property, said new property being associated with said new data type.

8. A computer-implemented method of customizing a component as recited in claim 1 wherein said property sheet includes a graphical user interface that is used to configure said component.

9. A computer-implemented method of customizing a component as recited in claim 1 wherein said component is created using the Java programming language.

10. A computer-implemented method of customizing a component as recited in claim 9 wherein said component is a Java Bean.

11. A computer-implemented method of customizing a component as recited in claim 9 wherein said data type is a Java data type.

12. A computer-implemented method for locating a first editor arranged to modify a first new property associated with a component that is to be used with an application builder tool, said first editor being instantiated from a first editor class and being associated with a first data type, said first data type being associated with said first new property, said first editor being arranged to receive input relevant to modifying said first new property, said method comprising:

searching a register, said register containing a listing of data types and editors which correspond to said data types, said register being arranged to map said data types with said editors; and determining if said first editor is one of said editors contained in said register; and, adding said first editor to said register if said first editor is not one of said editors contained in said register.

13. A computer-implemented method for locating a first editor as recited in claim 12 wherein when it is determined that said first editor is not one of said editors contained in said register, said computer-implemented method further includes searching for said first editor using a name associated with said first editor class.

14. A computer-implemented method for locating a first editor as recited in claim 13 further including adding said first editor to a property sheet associated with said component when said search for said first editor yields said first editor.

15. A computer-implemented method for locating a first editor as recited in claim 13 wherein said first data type has a first data type name, said first data type name being at least partially included in said first editor class name, wherein searching for said editor using said first editor class includes searching for said first editor class name.

16. A computer-implemented method for locating a first editor as recited in claim 13 wherein said first editor class name is a standard editor class name.

17. A computer-readable medium comprising computer-readable program code devices configured to cause a computer to:

(a) run a software program on said computer, said software program being an application builder tool;

(b) obtain a software component to be used by said software program, said component being capable of having a plurality of associated properties, each of said properties having an associated data type;

(c) obtain an editor for a new property; and (d) add said editor to a property sheet, said property sheet being associated with said component, said editor being arranged to be associate said new property with said component and said editor further being arranged to modify said new property.

18. A computer-readable medium as recited in claim 17 further including computer-readable program code devices configured to cause said computer to:

modify said property using said editor; and configure said component, wherein said component is configured through an implementation of said modified property.

19. A computer-readable medium as recited in claim 18 wherein said new property has a new data type associated with it, and said editor is a new editor that is added to said property sheet, said computer-readable program code devices further including computer-readable program code devices configured to cause said computer to create said new editor for said new property, said new property being associated with said new data type.

20. A user interface for use in customizing a component that is to be used with an application builder tool on a computer system, said component having at least one newly associated property, said newly associated property being associated with a data type, said user interface comprising:

at least one property editor, said property editor being associated with said newly associated property; and a customizer, said customizer being associated with said component, said customizer being arranged to enable said newly associated property with said component to be modified through the use of said property editor.

21. A user interface for use in customizing a component according to claim 20 wherein:

said data type is a new data type; and said property editor is a new property editor, said new property editor being associated with said new data type.

22. A user interface for use in customizing a component according to claim 21 wherein said new property editor is added to said customizer.

23. A computer-implemented method of customizing a component for use with an application builder tool, said computer-implemented method comprising:

(a) obtaining a component, said component being capable of having a plurality of associated properties;

(b) identifying an editor for a new property, said editor being arranged to associate said new property with said component and said editor further being arranged to modify said new property;

(c) adding said editor to a property sheet, said property sheet being associated with said component;

(d) associating said new property to said component; and (e) modifying said new property using said editor.

* * * * *